United States Patent
Bescherer et al.

(10) Patent No.: US 6,912,855 B2
(45) Date of Patent: Jul. 5, 2005

(54) METHOD FOR THE PRIMARY CONTROL IN A COMBINED GAS/STEAM TURBINE INSTALLATION

(75) Inventors: Helmut Bescherer, Fuerth (DE); Dieter Diegel, Roettenbach (DE); Reinhard Frank, Erlangen (DE); Peter Gottfried, Erlangen (DE); Michael Henning, Erlangen (DE); Oldrich Zaviska, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 92 days.

(21) Appl. No.: 10/333,217

(22) PCT Filed: Jul. 4, 2001

(86) PCT No.: PCT/EP01/07653

§ 371 (c)(1),
(2), (4) Date: Jan. 21, 2003

(87) PCT Pub. No.: WO02/08576

PCT Pub. Date: Jan. 31, 2002

(65) Prior Publication Data

US 2003/0167774 A1 Sep. 11, 2003

(30) Foreign Application Priority Data

Jul. 31, 2000 (EP) ............................................ 00115684

(51) Int. Cl.⁷ ................................................ F02C 1/00
(52) U.S. Cl. .................... 60/772; 60/39.181; 60/39.182
(58) Field of Search ....................... 60/773, 774, 39.25, 60/39.3, 39.181, 39.182, 772

(56) References Cited

U.S. PATENT DOCUMENTS

| | | | | |
|---|---|---|---|---|
| 4,071,897 A | * | 1/1978 | Groves et al. .............. 700/290 |
| 4,333,310 A | * | 6/1982 | Uram ...................... 60/39.182 |
| 4,368,520 A | * | 1/1983 | Hwang et al. .............. 700/289 |
| 4,418,285 A | * | 11/1983 | Podolsky et al. ......... 290/40 R |
| 4,471,446 A | * | 9/1984 | Podolsky et al. ........... 700/290 |
| 4,578,944 A | * | 4/1986 | Martens et al. .......... 60/39.182 |
| 5,148,668 A | * | 9/1992 | Frutschi ....................... 60/775 |
| 5,203,160 A | * | 4/1993 | Ozono ......................... 60/778 |
| 5,367,870 A | * | 11/1994 | Vollmer ................... 60/39.182 |
| 6,338,241 B1 | * | 1/2002 | Shibuya et al. .......... 60/39.182 |
| 6,609,361 B2 | * | 8/2003 | Vugdelija ................ 60/39.182 |
| 6,644,011 B2 | * | 11/2003 | Cheng ..................... 60/39.182 |

FOREIGN PATENT DOCUMENTS

EP 0976914 2/2000

* cited by examiner

Primary Examiner—Cheryl Tyler
Assistant Examiner—William H. Rodriguez
(74) Attorney, Agent, or Firm—Harness, Dickey & Pierce, P.L.C.

(57) ABSTRACT

The aim of the invention is to improve a method for the primary control so that reserve power that is practically completely available for the effective frequency boost within seconds is available also in the stem turbine part of a gas/steam turbine installation. To this end, the pressure stage is operated with a control valve (6, 7, 8) that is throttled to such an extent that a frequency boost power reserve is built up. Said power reserve is used for frequency boosting in the event of an underfrequency by correcting the desired value depending on the underfrequency. Said corrected value corresponds to an effective area of the flow that is increased vis-à-vis the throttled condition of the control valve (6, 7, 8) and acts on the effective area of flow of the control value (6, 7, 8) with an impressed signal that approaches zero after a predetermined time. Said signal is chosen in such a manner that, despite the correction of the desired value, a stable operative condition is maintained in accordance with the response behavior of the gas/steam turbine installation to the increased effective area of flow.

20 Claims, 2 Drawing Sheets

METHOD FOR THE PRIMARY CONTROL IN A COMBINED GAS/STEAM TURBINE INSTALLATION

This application is the national phase under 35 U.S.C. §371 of PCT International Application No. PCT/E-P01/07653 which has an International filing date of Jul. 4, 2001, which designated the United States of America and which claims priority on German Patent Application number EP 00115684.3 filed Jul. 21, 2000, the entire contents of which are hereby incorporated herein by reference.

FIELD OF THE INVENTION

The invention generally relates to a method for primary control in a combined gas and steam turbine installation.

BACKGROUND OF THE INVENTION

A gas and steam turbine installation has a gas turbine part and a steam turbine part with at least one pressure stage. The working steam of the steam turbine part is generated by one or more waste-heat boilers fed with the waste heat from the gas turbine part. The pressure stage has at least one steam turbine control valve. In this arrangement, the control valve passage cross section is adjusted by means of a control system whose required value is formed by the use of a control parameter, relating to power, of the pressure stage. A control parameter relating to power means that the control system permits control of the power of the pressure stage. In this arrangement, the control parameter relating to power can also be the power of the pressure stage itself. This will be considered in more detail later.

A discrepancy between the instantaneous main system frequency and a required main system frequency is determined in a frequency control system and counteracting control action is taken as compensation for the discrepancy.

Main system operators must guarantee fundamental mains system operational properties. This, in particular, also includes a certain temporal electrical frequency (Europe: 50 Hz) which is stable with respect to the electrical power demanded. Discrepancies from this are only tolerated within certain narrow limits. The frequency stability in the main system is ensured by use of dynamic load/power compensation. For this purpose, substantial reserve power must be available within seconds. The main system operators must be able to offer this reserve power as a service.

In the case of combined gas and steam turbine installations, this reserve power has previously been made available by the gas turbine part of the installation. Combined gas and steam turbine installations are installations in which waste-heat boilers are connected downstream of the gas turbines in order to operate a steam turbine installation. In this arrangement, the exhaust gas temperature of the gas turbines is generally kept constant over a wide power range. In such operation, however, there are limits to the change in the gas turbine power. The load-changing capability is essentially limited by the dynamics of the exhaust gas temperature control and, therefore, by the ability to change the air mass flow through the gas turbine. The steam turbine part of the installation generally follows the power changes of the gas turbines with the substantially more sluggish time response of the waste-heat process. In the case of combined gas and steam turbine installations using frequency control, the change in the power demanded by the main system is currently, therefore, brought about exclusively by the gas turbine part of the installations, because the steam turbine part makes no contribution in the initial seconds. The water/steam circuit, i.e. the steam generation and the steam turbine, is only a passive part of the overall gas and steam turbine installation and acts only as a waste-heat recovery unit.

In consequence, the gas turbine alone must provide the total reserve power in the case of primary control. During the operation of the installation, therefore, the frequency control reserves have to be included in the calculations for the gas turbine alone and the block power in steady-state operation is then reduced by a correspondingly high proportion.

SUMMARY OF THE INVENTION

An object of an embodiment of the present invention is to provide a method which, in the case of the gas and steam turbine installation, also permits the provision of reserve power in the steam turbine part, which reserve power is almost completely available within seconds for effective frequency maintenance.

An embodiment of the invention offers the advantage that almost all of the reserve power, which is provided for both the gas part and the steam part, can be made available within seconds. In particular, the reserve power attributable to the steam part can, according to an embodiment of the invention, be made available within seconds. There is, therefore, no longer a delayed reaction of the steam turbine part, as mentioned in the prior art. The installations can therefore maintain the reserve power at higher unit power and the activation of the control reserve within seconds is dynamically improved by the contribution of the steam turbine. In addition to the increased economy due to the participation in the frequency regulation, operators of combined gas and steam turbine installations will also, therefore, find electricity generation at higher block power more profitable.

This advantage may be achieved by a frequency maintenance power reserve being built up for the steam part in the boiler reservoir. For this purpose, the pressure stage is operated with a throttled control valve. Because of the throttling procedure, a back pressure builds up before the control valve until an equilibrium condition is reached between the instantaneous pressure and the mass flow. In the case of underfrequency, the frequency maintenance power reserve is used for frequency maintenance by required value correction being formed which is determined by the amount by which the frequency is too low. The required value correction relates to the required value of the control parameter which, in the relevant gas and steam turbine installation, is used for required/actual control. This means that a required value correction is formed, as a function of the amount by which the current frequency is less than the required frequency, which required value correction counteracts the frequency discrepancy.

The required value correction therefore corresponds to an increased passage cross section relative to the throttled condition of the control valve. It acts, using an applied signal decaying with time, on the passage cross section of the relevant control valve. By this, the relevant passage cross section is increased by an amount corresponding to the required value correction in accordance with the variation with time of the applied decaying signal, i.e. the throttling is, to this extent, canceled. In consequence, the stored frequency-support power reserve is activated (at least partially) for frequency maintenance in the case of underfrequency.

The throttling and the cancellation of the throttling are therefore effected by way of the valve setting. In this connection, a throttling device that the passage cross section of the control valve is restricted and, due to the increase in pressure before the valve, the same mass flow as flowed before the throttling continues to flow when the valve is fully open.

In this arrangement, the signal decaying with time is used to limit the duration and magnitude of the throttling cancellation mentioned. This corresponds to a temporary amplification of the required value correction. The signal decaying with time starts at a finite value and falls to zero after a predetermined time. In this arrangement, the decaying signal can, for example, be multiplied by the required value correction so that the result (by means of an opening regulator, for example) acts on the relevant control valve. In consequence, the resulting overall signal, which corresponds to the extent to which the throttling mentioned above is canceled, advantageously falls to zero after the predetermined duration so that the condition without required value correction is then restored.

The signal decaying with time is dimensioned with respect to its magnitude, its variation and its duration in such a way that, taking account of the response behavior of the gas and steam turbine installation to an increased passage cross section, a stable operating condition is ensured with the required value correction. This takes account of the fact that the passage cross section of the control valve can only be increased to such an extent and for so long that the pressure does not fall excessively. This will be considered in more detail later. The participation of the steam part in the frequency maintenance, by which means the advantages mentioned above can be achieved, is possible for the first time due to the invention. It is, therefore, likewise possible with the invention, for the first time, for a gas and steam turbine installation to participate in a more economic manner in the frequency control, using both the gas turbine part and the steam turbine part. By this, the load on the gas turbine part is reduced by the participation of steam turbine part in the case of underfrequency and no longer needs to provide, by itself, the total power reserve necessary for frequency maintenance in the first seconds.

For gas and steam turbine installations, the method according to an embodiment of the invention offers the additional advantage that the extra power necessary for frequency maintenance in the case of underfrequency is not provided by power being supplied just at the moment of demand but has already been provided previously by a temporary slight increase in power of the gas turbine part. The temporary slight increase in the power proportion necessary for building up the steam reservoir reserve is not, however, lost but is actually reused, in the case of frequency maintenance, by being released from the steam reservoir. Compensation for the temporarily smaller steam turbine power during the build-up of the steam reservoir reserve can be provided without difficulty by the gas turbine power by means of a power control system which applies to the complete block so that, furthermore, the sum of the power demands on the block can always be met.

It is proposed that the control parameter relating to power should be the upstream pressure present in the region of the control valve, which upstream pressure is determined by measuring the steam throughput and converting it with the aid of a modified sliding pressure characteristic, which is characteristic of the pressure stage and corresponds to a throttled control valve. The valve setting is therefore determined from the modified sliding pressure characteristic. In this system, a required pressure value is calculated which represents the pressure value to be set within the pressure stage. The relationship between the instantaneous steam throughput and the pressure is provided by the modified sliding pressure characteristic which is characteristic of the pressure stage. In this system, the modified sliding pressure characteristic is referred to a passage cross section reduced relative to the fully opened control valve (natural sliding pressure characteristic).

In this way, a power reserve is available in the pressure stage at the modified sliding pressure operating point. In the case of underfrequency, this power reserve can, according to the invention, be used for frequency maintenance by a controlled increase in the passage cross section of the control valve.

The signal decaying with time is a decaying signal which decays with a time constant. In the case of a decay time constant=0, the decaying signal can also be a square wave signal. A decaying signal in which the time constant and/or the signal shape of the decaying signal is a model of the impulse response with time of the combined gas and steam turbine installation is, however, preferred. In this arrangement, the time constant provides the rate of decrease of the decaying signal. As an approximation, the decaying signal has sufficiently or completely decayed after some three to six time constants. The essential parameters of the gas and steam turbine installation are taken into account in the decaying signal; the decaying signal therefore corresponds to the real behavior and, in the ideal case, reflects the real behavior. The $D-T_1$ has an abrupt rise and, subsequently, a variation decreasing with the time constant. The $D-T_2$ function does not, in contrast, have an abrupt rise but, rather, a continuous rise which likewise has a time constant. The time constant of the rising section, however, is substantially smaller than that of the falling section.

The $D-T_n$ function can be mathematically represented by the following relationship:

$$D - T_n = T_D \frac{s}{(1 + sT_1)(1 + sT_2)\ldots}$$

where $T_D$ is an appropriate lead time constant, s is the corresponding Laplace operator and $T_n$ is the corresponding time constants, which are each characteristic of the relevant installation. A suitable model function can be derived in this way.

The use of the $D-T_n$ function ensures that the required value correction acts on the passage cross section of the control valve with a time behavior which is characteristic of the gas and steam turbine installation.

The time constants have to be selected as a function of the storage capacity of the steam part of the installation. For most installations, the time constants are between 10 and 200 seconds.

The block power of the combined gas and steam turbine installation is preferably controlled jointly. If such a control system is provided, it is proposed that the required value correction, in particular with impressed signal which vanishes with time, should be additionally processed in an inhibit circuit for the block power control. The inhibit circuit inhibits correction of the block power by means of block power control where this correction would counteract a power change to the pressure stage, or to the steam turbine part, on the basis of the required value correction, in particular with an applied signal decaying with time. The required value correction is, in consequence, fed to the stop circuit for block power control.

Thus, when the passage cross section of the control valve is increased on the basis of the required value correction, in particular with an applied signal decaying with time, an increase in the block power would be initially registered in the block power system, whereupon the block power control system would counteract the increasing block power. In this case, however, the increase in the block power is desired on the basis of the required value correction so that the action against the block power increase—which is the correction to the block power mentioned above—has to be inhibited in this case.

This also applies in the opposite case, namely where the passage cross section of the control valve is reduced again. A reduction in the passage cross section has to be considered, for example, where there is an excessively high main system frequency. The block power control system—corresponding to the case mentioned above—would then register a reduction in the block power and would tend to counteract it. In this case, the increase—which is the correction to the block power mentioned above—must again be inhibited. With the stop circuit mentioned, an embodiment of the invention functions more effectively because a reaction of the block power control system against the effect of the required value correction—in particular with an applied signal decaying with time—is prevented.

A control action opposing the required value control for the modified sliding pressure, which action would likewise oppose any storage procedures or release procedures, is prevented by the fact that a determination of the pressure variation and of the steam throughput variation takes place in the pressure stage and, in the case of opposition between the parameters mentioned above, the respective direction, of the required value change, which acts against the tendency of the control parameters is inhibited. A storage procedure occurs during throttling of the control valve when the power reserve is being built up. A release procedure occurs when the throttling is canceled and the stored power reserve is—at least partially—released for frequency maintenance. In this case, the pressure in the pressure stage is reduced because of the increase in the passage cross section, the steam throughput increasing simultaneously. In this case, therefore, the two parameters act oppositely. The increase in the pressure required value—which would, in this case, act in the opposite direction—is then inhibited.

BRIEF DESCRIPTION OF THE DRAWINGS

The invention is explained in more detail using embodiment examples illustrated in the figures. In these.

DETAILED DESCRIPTION OF THE PREFERRED EMBODIMENTS

Figure 1:
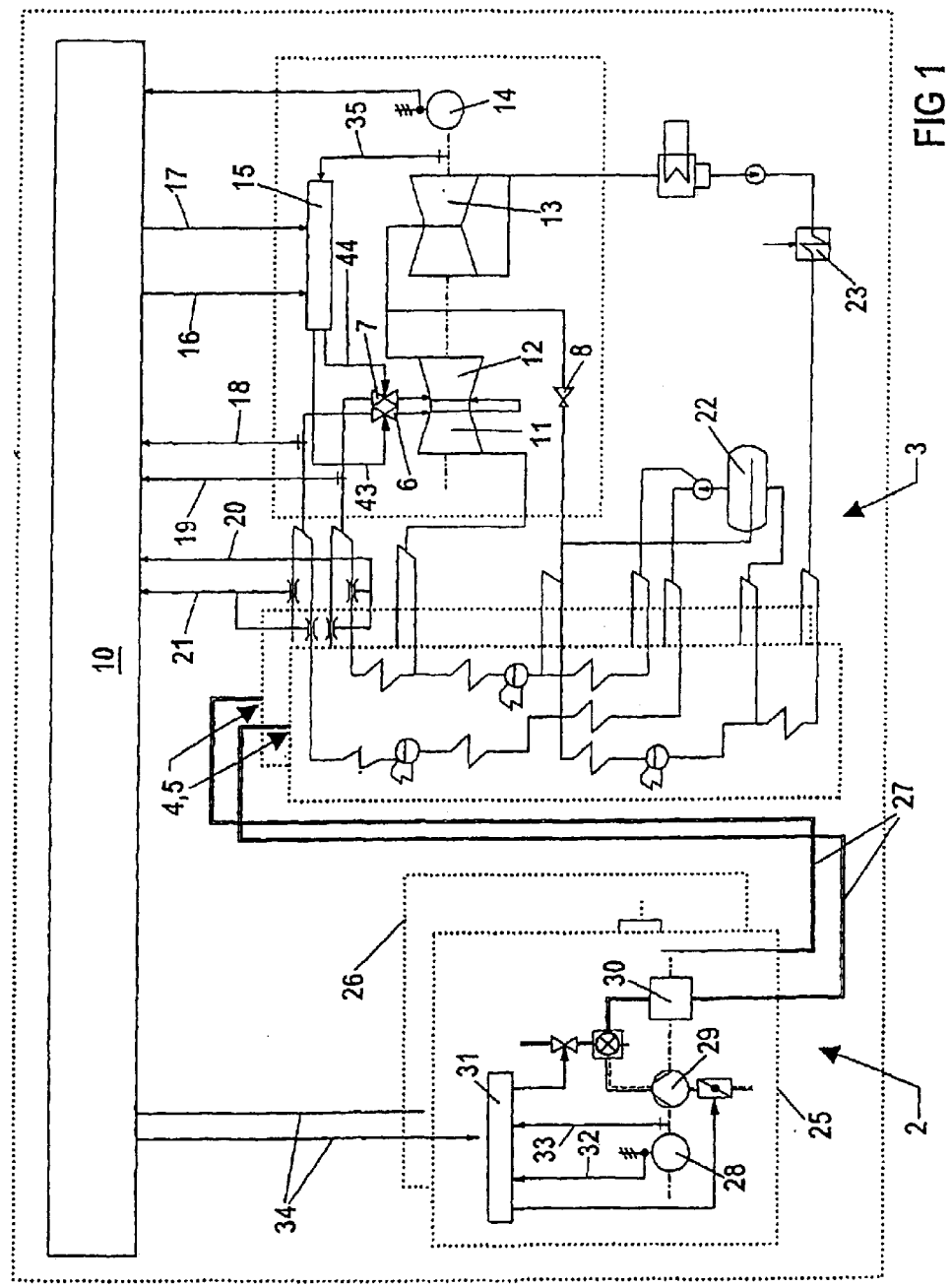
FIG. 1 shows a schematic block diagram of a gas and steam turbine installation.

The schematic block diagram in FIG. 1 shows a gas and steam turbine installation 1, shown in an embodiment with two gas turbines, each with a downstream triple-pressure waste-heat boiler and one steam turbine. The gas and steam turbine installation 1 has a gas turbine part 2 and a steam part 3. higher level block control system 10 is provided which permits the coordinated open-loop and closed-loop control of the total gas and steam turbine installation 1. The gas turbine part 2 includes two gas turbine sets 25, 26. Each gas turbine set 25, 26 has a compressor 29, a turbine part 30 and a generator 28. A gas turbine control system 31 is provided to control the gas turbine set 25. The gas turbine sets 25, 26 obtain their required power values 34 from the block control system 10. An actual gas turbine power value 32 and an actual gas turbine rotational speed value 33 are stored in the gas turbine control system 31. The gas turbine rotational speed is used as the actual value for the frequency control of the gas turbine set. The second gas turbine set 26 is correspondingly constructed.

The waste heat from each of the two gas turbine sets 25, 26 is passed via an exhaust gas duct 27 to the respective downstream waste-heat boilers 4, 5 of the steam part 3 in the gas and steam turbine installation 1. In each pressure stage of the waste-heat boilers (three pressure stages are shown), steam is generated by way of the waste heat supplied, which steam is used in a downstream steam turbine 11, 12, 13 for electricity generation. Control elements (control valves or control flaps) 6, 7, 8 for influencing the throughput of steam through the steam turbine, which in the end determines the steam turbine power, are present at the steam turbine inlet in each pressure stage.

In order to determine the instantaneous main system frequency, the actual value of the steam turbine rotational speed 35 is tapped off for the steam turbine control system 15. On the basis of the actual steam turbine rotational speed value 35 measured, any discrepancy between the instantaneous frequency from the main system required frequency is determined there. The control system 15 of the steam turbine acts dynamically, i.e. temporarily, against such a discrepancy by way of compensation. For this purpose, the control valves of the individual pressure stages are actuated as determined by control signals, which depend on the frequency discrepancy. In the embodiment example shown, a live steam control valve 6 for a high-pressure stage and a medium-pressure control valve 7 for a medium-pressure stage are respectively present. In the case of overfrequency, steam is temporarily stored in the steam system by throttling the control valves and, in the case of underfrequency, it is temporarily released. There is, correspondingly, a temporary reduction in power or increase in power in the steam turbine.

In order to make it at all possible to react with release from storage in the case of underfrequency, it is necessary to have previously built up a steam reservoir reserve. This is achieved by increasing the steam pressures by use of the steam turbine valves in the individual pressure stages, as specified by modified sliding pressure characteristics 9. After a certain time period for throttling the control valves 6, 7, a modified sliding pressure operating point is achieved in which the steam reservoir reserve is available. The modified sliding pressure characteristics 9 are specified for each pressure stage as a function of the steam mass flow to the steam turbine. By way of a special, appropriate recognition circuit 46, 47, its value is temporarily inhibited during the release used for frequency maintenance so that no action is taken, by way of the sliding pressure characteristic, against the release procedure (this will be considered in more detail later, see FIG. 2).

In addition to the high-pressure partial turbine 11 and the medium-pressure partial turbine 12, a low-pressure partial turbine 13 is also present (FIG. 1), to which, in addition to the exhaust steam from the medium-pressure partial turbine, steam from the low-pressure stage of the waste-heat steam generator is supplied via a low-pressure control flap 8. The use of the low-pressure control flap for frequency maintenance is not shown in the present exemplary embodiment.

According to an embodiment of the invention, however, the low-pressure control flap 8 of the low-pressure partial turbine 13 can also be used for frequency maintenance.

In order to determine the modified sliding pressure characteristic, the steam mass flow 21, 20 of the associated pressure stage is recorded and supplied to the block control system 10 for the determination of the required pressure values for each pressure stage. In addition, the actual pressure value 18, 19 present before the respective control valve 6, 7 is tapped off and is likewise supplied to the block control system 10. The control system according to an embodiment of the invention can take place by use of the parameters mentioned, which have been measured in the steam circuit. For this purpose, the required high-pressure value 16 and the required medium-pressure value 17, as determined in accordance with the control system, are supplied by the block control system 10 (where the values mentioned are tapped off and the control parameters can be calculated) to the steam turbine control system 15 and are used there for controlling the steam turbine power.

Figure 2:
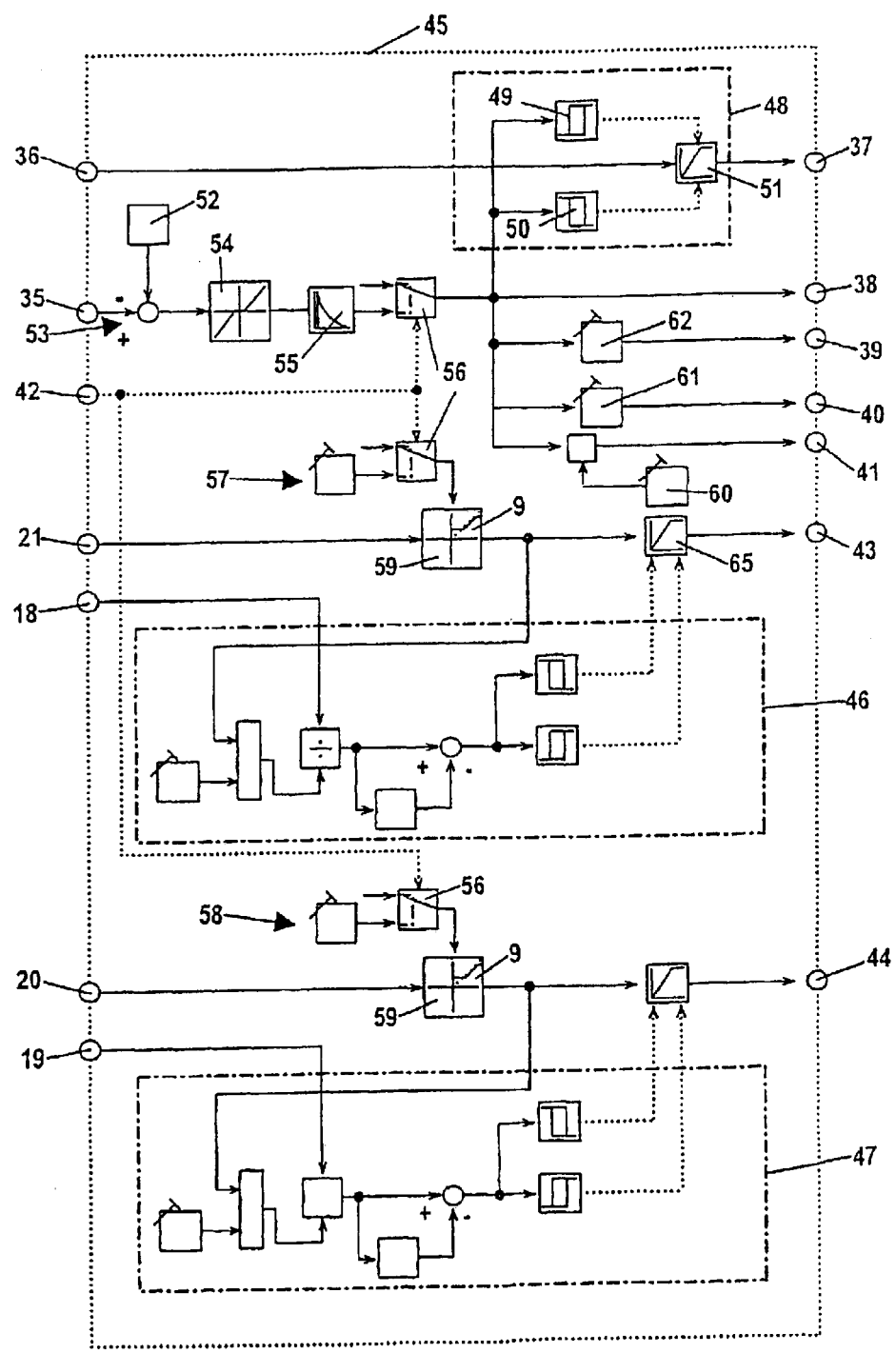
FIG. 2 shows a schematic block diagram of a control device for carrying out the method according to an embodiment of the invention.

FIG. 2 shows a schematic block diagram of a control device for carrying out the method according to an embodiment of the invention. This is a control device for primary control 45, which includes of one circuit in each case for using the high-pressure stage and the medium-pressure stage of the steam turbine of a combined gas and steam turbine installation. The block diagram of FIG. 2 therefore relates to a control device for controlling a gas and steam turbine installation as shown in FIG. 1 where, again, throttling or widening is only provided for the passage cross sections of the control valves 6 and 7 of the high-pressure stage and the medium-pressure stage. The circuit can also be extended in a corresponding, suitable manner for the use of the control flap 8 of the low-pressure stage.

In the exemplary embodiment shown, the control valve passage cross section is determined by controlling the upstream pressure, the required value being specified by means of a modified sliding pressure characteristic. The upstream pressure is therefore the control parameter relating to power. For this purpose, it is also possible to make direct use of the power of the pressure stage, where this is being determined. In the present case, the power is converted into pressure.

An on/off signal 42 can be provided which switches the frequency influence, according to an embodiment of the invention, on and off. The frequency influence is switched off, for example, if the participation, according to an embodiment of the invention, of the steam turbine is not desired in the frequency maintenance procedure. The switches 56 would then be in the off position. If the switches 56 are in the on position, the frequency maintenance according to an embodiment of the invention is activated.

The actual high-pressure throughput value 21 is measured and, in the evaluation circuit 59, converted into a required value by way of the sliding pressure characteristic 9. The high-pressure throttling 57 specifies the amount of throttling of the control valve 6. This is calculated by an additional required pressure value proportion being specified which, using the sliding pressure characteristic 9, provides in the latter a correspondingly modified sliding pressure as the required value. The required pressure value is then fed into the required value control system 65 and is then passed on to the steam turbine control system 43 (for the high-pressure part). The required value is converted there, by means of a control function, into a control value for the corresponding control valve and then acts on the control valve.

The required steam turbine rotational speed value 35 is continuously tapped off and compared 53 with the required frequency value 52 (after the rotational speed has been converted into the corresponding frequency). In this procedure, the frequency discrepancy is evaluated by way of a static characteristic 54 provided, which gives the characteristic of the required pressure value correction as a function of the frequency discrepancy present. In this arrangement, the static characteristic 54 can have a predetermined dead band; if the frequency discrepancy lies within the dead band, the required pressure value correction is equal to zero. In the dynamic block 55, the required pressure value correction receives, in impressed form, a signal decaying with time.

If the switch 56 is in the on position, the required pressure value correction determined in this way is passed on via the output 38 (at which is present the required pressure value correction dynamically evaluated by the signal decaying with time) to the pressure control system corresponding to the pressure stage. By this, the discrepancy can be taken into account in this pressure control system on the basis of the required value correction. This results in the pressure control system remaining "at rest" due to the application of the required value correction and not counteracting the change in the actual value. The required pressure value correction with the applied signal decaying with time—evaluated by an evaluation factor 62 which converts the required pressure value correction into the corresponding valve setting—is passed on simultaneously via the output 39 to the pressure control system output of the high-pressure part of the steam turbine. This effects the corresponding adjustment to the setting value of the control valve.

The dynamically evaluated required pressure value correction—evaluated by the evaluation factor 61 which converts the required pressure value correction into the corresponding valve setting—is correspondingly present at the medium-pressure control output 40. The control discrepancy is also corrected for the medium-pressure stage by the dynamically and statically evaluated required pressure value correction 41 being present in the pressure control system and therefore likewise holding the pressure control system for the medium-pressure stage "at rest".

In addition, an inhibit circuit 48 is provided for block power control, in which is processed the required value correction by way of the applied signal, decaying with time. This circuit 48 stops that correction to the block power which counteracts the change in power of the pressure stage, or of the steam turbine part, on the basis of the required value correction using the applied signal decaying with time. This is represented by the binary signals, "higher" stop 49 and "lower" stop 50. The corresponding stop signals act on the required value control system 51 of the block power control system, which transmits, in accordance with the required block power value 36, a required power value for the gas turbine(s) at the control system output 37 for controlling the power.

Using the actual high-pressure value 18, the recognition of the opposing nature of the actual high-pressure value variation and the actual mass flow value variation in the pressure stage takes place in a high-pressure recognition circuit 46. When the parameters mentioned above are in opposition, the respective direction of the required value change acting against the tendency of the actual high-pressure value is inhibited. In detail, a quotient of these parameters is formed, which is used to determine whether the parameters are developing in opposition. The required value control system 65 is then respectively inhibited in the manner mentioned above.

In addition, a medium-pressure throttling 58, which can likewise be switched on and off by means of a switch 56, also takes place. There again, the calculation of the pressure takes place by use of an evaluation circuit 59 using the modified sliding pressure characteristic 9. For the medium-pressure part, however, the actual medium-pressure throughput value 20 is present at the input and the result of the required block pressure value control system 44 is present at the outlet. A recognition circuit 47, which functions by analogy with the high-pressure recognition circuit 46 mentioned above, is also provided for the medium-pressure part. In this case, the actual medium-pressure value 19 is present at the input.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control method for a combined gas and steam turbine installation, having a gas turbine part and steam part with at least one pressure stage whose working steam is generated by at least one waste-heat boiler fed with waste heat from the gas turbine part and whose control valve passage cross section is adjusted by a control system, whose required value is controlled by use of a control parameter, relating to power, of the pressure stage, comprising:

operating the pressure stage with a control valve throttled in such a way that a frequency-support power reserve is built up which, in the case of under-frequency, is used for frequency maintenance by a required value correction being formed which is determined by the amount by which the frequency is too low, wherein the required value correction corresponds to an increased passage cross section relative to the throttled condition of the control valve and acts, using an applied signal decaying with time, on the passage cross section of the control valve; and dimensioning the signal decaying with time in such a way that, taking account of the response behavior of the gas and steam turbine installation to the increased passage cross section, a stable operating condition is ensured despite required value correction.

2. The method as claimed in claim 1, wherein the control parameter relating to power is the upstream pressure present in the region of the control valve, the upstream pressure being determined by measuring the steam throughput and converting it with the aid of a modified sliding pressure characteristic, which is characteristic of the pressure stage and corresponds to a throttled control valve.

3. The method as claimed in claim 1, wherein the signal decaying with time is at least one of a square wave signal and a decaying signal which decays with a time constant, at least one of the time constant and the signal shape of the decaying signal being a model for the combined gas and steam turbine installation.

4. The method as claimed in claim 3, wherein the signal decaying with time corresponds to a $D-T_n$ model function for the combined gas and steam turbine installation as follows:

$$D - T_n = T_D \frac{s}{(1+sT_1)(1+sT_2)\ldots}$$

where $T_D$ is a lead time constant, s is the corresponding Laplace operator and $T_n$ is the corresponding time constants.

5. The method as claimed in claim 3, wherein at least one of the time constant and the length of the square wave signal is between 10 and 200 seconds.

6. The method as claimed in claim 1, wherein block power control of the combined gas and steam turbine installation takes place and wherein the required value correction, in particular with an applied signal decaying with time, is additionally processed in an inhibit circuit of the block power control system which inhibits correction of the unit power which counteracts the power change to the pressure stage, or to the steam turbine part, on the basis of the required value correction, in particular with an applied signal decaying with time.

7. The method as claimed in claim 1, wherein a determination of the pressure variation and of the mass flow variation takes place in the pressure stage and, in the case of opposition between the parameters, the respective direction, of the required value change, which counteracts the tendency of the control parameter is inhibited.

8. The method as claimed in claim 2, wherein the signal decaying with time is at least one of a square wave signal and a decaying signal which decays with a time constant, at least one of the time constant and the signal shape of the decaying signal being a model for the combined gas and steam turbine installation.

9. The method as claimed in claim 8, wherein the signal decaying with time corresponds to a $D-T_n$ model function for the combined gas and steam turbine installation as follows:

$$D - T_n = T_D \frac{s}{(1+sT_1)(1+sT_2)\ldots}$$

where $T_D$ is a lead time constant, s is the corresponding Laplace operator and $T_n$ is the corresponding time constants.

10. The method as claimed in claim 4, wherein at least one of the time constant and the length of the square wave signal is between 10 and 200 seconds.

11. The method as claimed in claim 1, wherein block power control of the combined gas and steam turbine installation takes place and wherein the required value correction with an applied signal decaying with time, is additionally processed in an inhibit circuit of the block power control system which inhibits correction of the unit power which counteracts the power change to at least one of the pressure stage and to the steam turbine part, on the basis of the required value correction.

12. The method as claimed in claim 1, wherein block power control of the combined gas and steam turbine installation takes place and wherein the required value correction with an applied signal decaying with time, is additionally processed in an inhibit circuit of the block power control system which inhibits correction of the unit power which counteracts the power change to at least one of the pressure stage and the steam turbine part, on the basis of an applied signal decaying with time.

13. The method as claimed in claim 1, wherein block power control of the combined gas and steam turbine installation takes place and wherein the required value correction is additionally processed in an inhibit circuit of the block power control system which inhibits correction of the unit power which counteracts the power change to at least one of the pressure stage and to the steam turbine part, on the basis of an applied signal decaying with time.

14. A control method for a combined gas and steam turbine installation, having a gas turbine part and steam part with at least one pressure stage, whose control valve passage cross section is controlled by use of a control parameter, relating to power, of the pressure stage, comprising:

throttling the control valve, to operate the pressure stage, such that a frequency-support power reserve is built up;

using, in the case of under-frequency, the frequency-support power reserve for frequency maintenance;

determining a required value correction based upon an amount by which the frequency is too low, wherein the required value correction corresponds to an increased passage cross section relative to the throttled condition of the control valve and acts, using an applied signal decaying with time, on the passage cross section of the control valve; and dimensioning the signal decaying with time in such a way that, taking account of the response behavior of the gas and steam turbine installation to the increased passage cross section, a stable operating condition is ensured despite required value correction.

15. The method as claimed in claim 14, wherein the control parameter relating to power is the upstream pressure present in the region of the control valve, the upstream pressure being determined by measuring the steam throughput and converting it with the aid of a modified sliding pressure characteristic, which is characteristic of the pressure stage and corresponds to a throttled control valve.

16. The method as claimed in claim 14, wherein the signal decaying with time is at least one of a square wave signal and a decaying signal which decays with a time constant, at least one of the time constant and the signal shape of the decaying signal being a model for the combined gas and steam turbine installation.

17. The method as claimed in claim 16, wherein the signal decaying with time corresponds to a $D-T_n$ model function for the combined gas and steam turbine installation as follows:

$$D - T_n = T_D \frac{s}{(1+sT_1)(1+sT_2)\ldots}$$

where $T_D$ is a lead time constant, s is the corresponding Laplace operator and $T_D$ is the corresponding time constants.

18. The method as claimed in claim 16, wherein at least one of the time constant and the length of the square wave signal is between 10 and 200 seconds.

19. The method as claimed in claim 14, wherein block power control of the combined gas and steam turbine installation takes place and wherein the required value correction, in particular with an applied signal decaying with time, is additionally processed in an inhibit circuit of the block power control system which inhibits correction of the unit power which counteracts the power change to the pressure stage, or to the stream turbine part, on the basis of the required value correction, in particular with a signal decaying with time.

20. The method as claimed in claim 14, wherein a determination of the pressure variation and of the mass flow variation takes place in the pressure stage and, in the case of opposition between the parameters, the respective direction, of the required value change, which counteracts the tendency of the control parameter is inhibited.

\* \* \* \* \*